United States Patent [19]

Carr

[11] Patent Number: 4,597,010

[45] Date of Patent: Jun. 24, 1986

[54] VIDEO DATA TRANSMISSION

[75] Inventor: Michael D. Carr, Ipswich, England

[73] Assignee: British Telecommunications, England

[21] Appl. No.: 765,556

[22] Filed: Aug. 12, 1985

Related U.S. Application Data

[63] Continuation of Ser. No. 515,497, Jul. 20, 1983, abandoned.

[30] Foreign Application Priority Data

Jul. 23, 1982 [GB] United Kingdom ................. 8221407

[51] Int. Cl.[4] ............................................. H04N 7/12
[52] U.S. Cl. .................................... 358/136; 358/133; 358/135
[58] Field of Search ............... 358/133, 135, 136, 138, 358/260, 105

[56] References Cited

U.S. PATENT DOCUMENTS

| | | | |
|---|---|---|---|
| 2,921,124 | 1/1960 | Graham | 358/138 |
| 3,715,483 | 2/1973 | Limb et al. | 358/133 |
| 3,736,373 | 5/1973 | Pease | 358/136 |
| 3,824,590 | 7/1974 | Limb | 340/347 AD |
| 3,984,626 | 10/1976 | Mounts et al. | 358/133 X |
| 4,090,221 | 5/1978 | Connor | 358/105 X |

OTHER PUBLICATIONS

Proceedings of the Society of Photo-Optical Instrumentation Engineers, vol. 232, 1980 International Optical Computing Conference (Book II), Apr. 10-11, 1980, Washington, Washington (US), B. R. Hunt: "Optical Implementation of a Spatially Adaptive Image Data Compression System", pp. 210-215.

IEE Transaction on Communications, vol. COM-25, No. 11, Nov. 1977, New York (US), G. Haskell et al: "Interframe Coding of 525-Line, Monochrome Television at 1, 5 mbits/s", pp. 1339-1348.

National Telecommunications Conference NTC'74 Record, San Diego, CA, Dec. 2-4, 1974, IEEE, New York (US) S. K. Goyal et al: "Entropy Coded Differential Pulse Code Modulation Systems for Television", pp. 72-76.

L'Echo des Recherche, No. 83, Jan. 1976, Is-
(List continued on next page.)

Primary Examiner—James J. Groody
Assistant Examiner—Victor R. Kostak
Attorney, Agent, or Firm—Nixon & Vanderhye

[57] ABSTRACT

A conditional replenishment video data transmission system involves the transmission of digital values representing the brightness changes at picture elements of a raster scanned image since the previous frame. Since nothing is transmitted for those picture elements without a significant brightness change, the amount of data to be transmitted will depend on the extent of movement in the image, and buffer stores are provided to allow the use of a constant transmission rate. If the extent of movement in the image is very high the buffer store at the receiver will tend to fill up and might overflow. In order to avoid this occurring, reduction of the amount of data to be transmitted by element subsampling has been proposed in which in a cluster of changing elements data relating to only some, for example alternate ones, of the elements are transmitted, and interpolation is used at the receiver to calculate the brightness change data for the omitted elements. The blurring of vertical edges in the image resulting from the interpolation is avoided by suspending sub-sampling where vertical edges are detected in the image. When in the sub-sampling mode, in order to avoid having to mark those normally omitted elements for which data are transmitted the receiver is arranged to detect the presence of a vertical edge and respond by treating the data as if they relate to all elements in the vicinity of the edge and not just the sub-sampled ones. Transmission error can result in the receiver being incorrect in the detection of edges, and to avoid this the number of quantizing levels during sub-sampling is reduced from 8 to 4, using one set of 4 codes for the normally present elements and the other set of 4 codes for the normally omitted elements. Since a vertical edge will usually appear in more than one line, the receiver may be arranged to check the previous line for a vertical edge and anticipate the inclusion of normally omitted elements if such an edge has occurred.

15 Claims, 6 Drawing Figures

OTHER PUBLICATIONS sy-les-Molineaux (FR), J. Poncin et al: "Systeme de Codage Numerique de l'Image de Television le Projet OCCITAN", pp. 28–37.

Apports de l'Informatique aux Telecommunications, tome 1, Congres AFCET (Association Francaise de Cybernetique et Technique), Nov. 7–9, 1973, Reenes (FR), H. Sequin: "Les Systemes de Codage d'Images Visiophoniques et Leur Integration dans le Reseau Numerique", pp. 25–31.

Rundfunktechnische Mitteilungen, vol. 20, No. 6, 1976, Hamburg (DE), J. Heitmann: Ein Systemkompatibles Digitales Farbfernsehsignal", pp. 236–241.

Conference on Communications Equipment and Systems, held at Birmingham (GB) Apr. 20–22, 1982, Appendix to IEE Conference, publication No. 209, T. S. Duffy et al: "A Codec for Visual Teleconferencing", pp. 12–16.

VIDEO DATA TRANSMISSION

This is a continuation, of application Ser. No. 515,497, filed July 20, 1983 which was abandoned upon the filing hereof.

BACKGROUND OF THE INVENTION

This invention relates to video data transmission and is especially useful in the transmission of video information employing conditional replenishment.

This application is related to commonly assigned co-pending U.S. application to Clapp Ser. No. 516,707 filed July 25, 1983.

A television frame typically contains about 200,000 picture elements, and if the data are to be sent digitally desirably 8 bits should be provided to convey the brightness information at each element. With a frame repetition frequency of 25 per second for a moving picture, digital transmission on the above basis would call for a transmission channel capacity of 40 M bit/s. This requirement can be reduced considerably by making use of the high correlation between one frame and the next which arises because usually only a small portion of the picture will be moving at any one time. Conditional replenishment involves the transmission of only the changes to an accuracy of only, say, 16 nonlinearly distributed quantising levels from one frame to the next and the resulting data reduction is normally greater than the additional data which must be sent to identify accurately the particular areas of the frame to which the changes relate. The areas are identified by line number and picture element address along the line; although 9 bits are necessary to identify the line number completely a saving is made by using only 3 bits giving the number modulo 8. A field synchronising code is sent to identify the first line of a field and so are all line numbers whether there is a change in the line or not. The rate of data transmission needed using conditional replenishment varies considerably because it depends on the amount of the frame which is moving at the particular time, whereas it is much more convenient to have a constant data transmission rate. In order to overcome this difficulty buffer stores are provided at both ends of the transmission channel, and it is important that these buffer stores neither become empty nor overflow. Using this technique it has proved possible to transmit a moving picture satisfactorily over a 2 M bit/s channel.

If $B_E(t)$ is the number of bits stored in the encoder buffer (termed the encoder state) at the transmission end of the channel at a time t and $B_D(t)$ is the number of bits stored in the decoder buffer at the recpetion end of the channel at time t, it can be shown that $$B_E(t-\Delta t) + B_D(t) = V_R \cdot \Delta t$$

where $V_R$ is the transmission capacity (in bit/s) of the channel and is assumed to be constant and $\Delta t$ is the time delay between data entering the encoder buffer store and them leaving the decoder buffer store. Normally an optimum value for $\Delta t$ is chosen which makes the total of the data stored in the buffers equal to half of the total available buffer memory, and the control of the decoder buffer is based on the state of the encoder buffer at a time $\Delta t$ earlier. This means that the emptying and overflowing of the decoder buffer can be anticipated and appropriate action taken, either temporarily suspending decoding or discarding data, so that the corruption of the reproduced picture resulting from data suddenly being not available or being lost can be avoided.

Since the replenishment data is derived from an image scanned by a conventional television raster and the reproduced image is updated from the replenishment data line by line of a similar raster, it follows that the reading of data from the decoder buffer must remain in track with the writing of data into the encoder buffer if changes in the first image are to appear accurately in the reproduced image. This forms an additional constraint on the reading from the decoder buffer and is handled by transmitting the encoder buffer state $B_E(t)$ to the decoder so that the decoder buffer state $B_D(t)$ can be predicted on the basis of the equation given above.

In addition, four techniques are used to reduce the extremely high rate of video data which might otherwise occur when there is a lot of picture movement. These four techniques are:

(1) The sensitivity of the movement detector at the encoder is reduced as the encoder buffer fill increases so that the number of areas of detected picture change is reduced.

(2) Field sub-sampling on a time basis is introduced. In this technique alternate fields of information are discarded and the decoder is operated so as to interplate the missing information from the two adjacent transmitted fields.

(3) Sub-sampling on an element basis is introduced so that certain moving area elements are discarded by the encoder and interpolated by the decoder.

(4) If the above techniques fail to prevent imminent overfill of the encoder buffer, then all movement of the transmitter picture is ignored until the encoder buffer state has returned to a safe value.

The reduction of the sensitivity of the movement detector at the encoder has the effect of freezing low contrast change information which results in an effect known as "dirty window". This can be tolerated for short periods. Field sub-sampling produces a movement jerkiness over the whole field and the provision of an interpolator at the decoder can be used to reduce the jerkiness by assuming that all movement is taking place at a uniform speed. Element sub-sampling which involves the transmission of the changes relating to alternate elements, for example, enables the amount of data transmitted when there is a lot of picture movement to be reduced to a minimum without introducing the stop movement technique referred to in (4) above. A disadvantage of element sub-sampling is that in areas of picture detail interpolation can be objectionable because the interpolation assumes that the brightness of an interpolated point is the average of the two adjacent points in the same line. This quite clearly is not true when the interpolated point is on a vertical edge between light and dark areas.

SUMMARY OF THE INVENTION

It is an object of the present invention to avoid this disadvantage of element sub-sampling.

According to the present invention there is provided a video data transmission system of the type in which a picture is represented by digital values corresponding to thr brightness at elements along parallel lines across the picture and only the elements which change in brightness from one frame to the next are transmitted from a transmitter to a receiver to update a digital representation of the picture stored in the receiver, and in which in order to reduce the rate of data transmission when many picture elements are undergoing changes in brightness those of certain isolated elements are not transmitted but are calculated at the receiver from the brightness changes of adjacent elements, wherein the selection of each of the certain isolated elements is dependent on there not being large differences between the brightnesses of adjacent or near adjacent elements in the preceding line and close to the particular certain isolated element.

The size of the difference between the brightness changes of adjacent or near adjacent elements in a line depends on whether or not there is a vertically extending moving edge in the picture. A large difference would indicate the presence of such an edge whereas a small difference would indicate its absence. An effect of element subsampling, that is not transmitting the brightness changes of certain isolated elements but calculating them from those of the neighbouring elements, is that interpolation can degrade high contrast vertical edges. This effect is avoided by the invention because sub-sampling is not used where there is vertical detail.

The element subsampling may involve transmitting the brightness changes of alternate elements only, this giving the maximum reduction in data rate that can be achieved because all omitted elements, i.e. those whose brightness changes are not transmitted, must have a transmitted element on each side for the subsampling not to give rise to substantial horizontal blurring. Preferably the omitted elements should lie in diagonal rather than vertical lines.

The line or field synchronising code words may carry an indication that the video data has been subjected to element subsampling and the receiver may be arranged to test the received data to ascertain whether or not a moving vertical edge was likely to have been detected by the encoder producing the data for transmission and consequently whether or not the brightness change of a particular element is included in the received data. Therefore there is required no specific indication that a normally omitted element has in fact been transmitted because this information is inherent in the video data.

Unfortunately, whilst the system just described is quite satisfactory with error-free data transmission, it takes only an error in the brightness change of a single element for the receiver to decide incorrectly as to whether an element in the next line has been omitted or not, which in turn will result in the changes represented being allocated to the wrong elements and consequent mistakes in the later lines. In order to overcome this problem the codes used to transmit the brightness changes of normally omitted elements may include an indication that the element is one which would normally be omitted. One way of achieving this is to reduce the number of quantising levels used when in the element subsampling mode as compared with normal transmission, to use the codes representing the reduced set of quantising levels for the normally transmitted elements, and to use the remaining codes for any normally omitted elements which are transmitted. Preferably the codes used for normally transmitted elements and normally omitted elements which are transmitted should be sufficiently different for a transmission error not to effect corruption of a code for one type of element to the code for the other type of element. The receiver may still test the elements in the preceding line to check for the expected transmission of normally omitted elements and watch for the codes for such elements.

In order that the invention may be fully understood and readily carried into effect it will now be described with reference to the accompanying drawings, of which:

DESCRIPTION OF THE PREFERRED EMBODIMENT(S)

Figure 1:
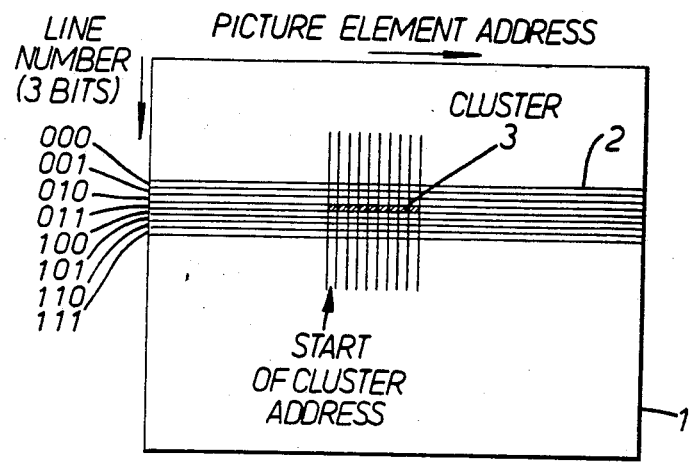
FIG. 1 is a diagram to be used for explaining the conditional replenishment and the generation of signals representing the changes at different picture elements.

In FIG. 1, the rectangle 1 represents the image area of a television picture and 2 represents a group of eight consecutive lines of the picture. The eight lines are given line numbers modulo 8 so that the number can be represented by a group of 3 bits from 000 to 111 as shown. Along each line the picture elements are given addresses depending upon their position along the line, there being 256 elements in each line. A cluster 3 of elements in the line 011 is indicated and it is assumed that these elements have undergone a change since the preceding frame. The elements forming the cluster 3 are identified by the line number 011 and the address of the start of the cluster. Once this information has been provided, the changes to the elements are presented sequentially using variable length Huffman codes. At the end of the cluster an end of cluster code appears.

If the transmitter and receiver have picture stores recording in digital form the brightness of the elements, which elements are scanned in conventional television manner in synchronism with the other picture store, then the data relating to changes in element brightness can be transmitted from one picture store to another so that the receiving picture store reproduces the information in the transmitter. Of course this data will require line and field synchronising code words to ensure that the scanning of the two picture is in synchronism. The line synchronising code words also include the 3-bit line number. The field synchronising code words are of two types identifying the odd and even fields of the normal interlaced scan.

Figure 2:
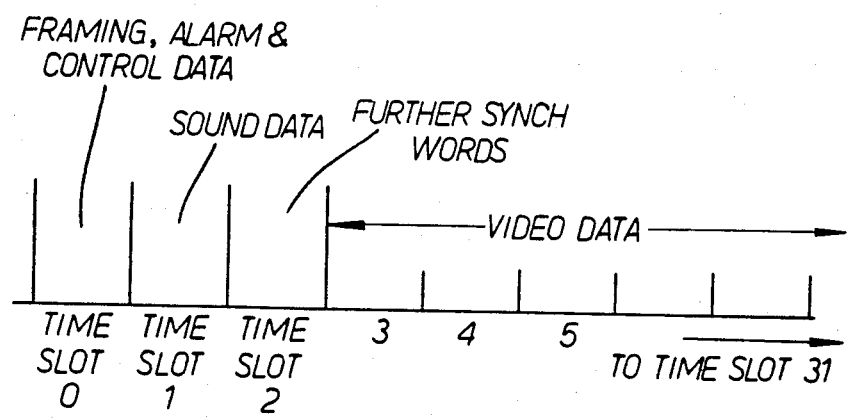
FIG. 2 represents the framing structure to be used in transmitting the data.

The data to be transmitted from the transmitter to the receiver is included in a conventional CCITT G732 framing structure. As shown in FIG. 2, this structure consists of 32 serial 8-bit time slots which form a frame. Sixteen of such frames form a multiframe. Time slot 0 of odd frames include a frame synchronising word for the framing structure in the form of a Barker sequence, together with one bit which forms with the single bits of other odd time slot 0's a Barker sequence over a multiframe, so that the timing of the framing structure can be recognised by the receiver. Alarm and control information is transmitted in the even time slot 0's. Sound data and further synchronising words appear in time slots 1 and 2. The remaining 29 time slots in each frame are filled with the video data including the line and field synchronising code words representing the changes to be transmitted from the transmitter picture store to the receiver picture store. As the amount of a picture which is moving at any one time is variable so the amount of data to be transmitted from the transmitter picture store to the receiver picture store will vary, but this data must be sent so as to keep the data in the receiver picture store substantially the same as the data in the transmitter picture store. In other words, the amount of data which has to be sent in one field scanning time varies with the amount of movement in the picture, and consequently the video data is asynchronous with the framing structure of the G732 format signal in which it is carried.

Figure 3:
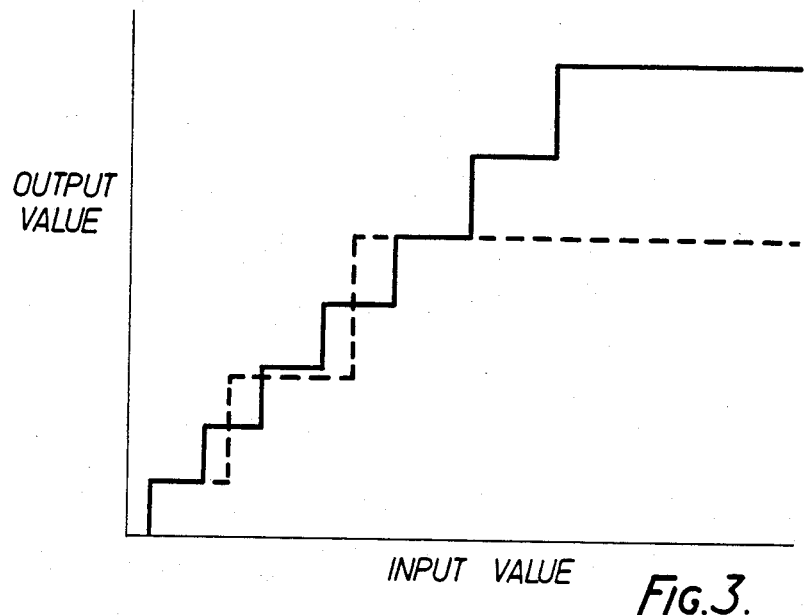
FIG. 3 represents an example of 8-level and 4-level quantising.

The brightness of a picture element is represented by an 8-bit binary number in the incoming PCM data, so that the change in brightness of an element can lie in the range −255 to +255. A representation of the changes on this basis would require 9 bits and in order to reduce this the changes are quantised to 16 levels. FIG. 3 shows the characteristic of an 8-bit quantiser for positive output values against positive input values. With a corresponding characteristic for negative values this would provide a 16-level quantiser. An embodiment calls for the use of an 8-level quantiser in place of a 16-level one when the normally omitted elements of a sub-sampled field are transmitted because of the presence of moving vertical edges. The broken line characteristic of FIG. 3 represents the relationship between a positive-going output value to a positive-going input value for a 4-level quantisation. Where the broken line characteristic overlies a solid line of the 8-level quantisation characteristic, the broken line is not shown. This is particularly noticeable at very low levels where for the whole of the first step of the characteristics the lines are superimposed. As with the 16-level quantisation, so the characteristic of the 8-level quantisation for negative values is the same as that for positive values but inverted.

When element sub-sampling is in use, the line synchronising signal will include a code indicating this fact. Ordinarily, the use of element sub-sampling will mean that the codes representing the brightness differences for alternate elements are omitted, provided that each omitted element is flanked on both sides by a transmitted element. If this is not the case then the element which would otherwise be omitted is transmitted, for example at the end of a cluster. Where an area of picture change extends over several lines the omitted elements are usually chosen in a diagonal or quincunx format. An effect of element sub-sampling is to reduce the data rate and it is introduced if the encoder buffer fills above a certain threshold value and the techniques (1) and (2), that is to say reduction in the sensitivity of the movement detector and field sub-sampling, are not either adequate or are inappropriate to deal with the problem. An effect of this reduction in data rate is to reduce the spatial resolution in areas where it is employed and the present invention seeks to avoid introducing this reduction in resolution in areas of high vertical detail so that only minimal degradation of the picture occurs as a result of its use.

It is proposed that the decoder should be able to reconstruct for itself information about the way in which the groups of data relating to the elements have been encoded. In this case this means that the decoder must be able to ascertain which elements have been sub-sampled and which have been transmitted, since it is undesirable to transmit extra signalling information.

An adaptive process dependent upon the information already encoded in the previous line is proposed as the criterion by which an element which would normally be omited during sub-sampling is in fact transmitted. If the encoder is operated on this basis, then the decoder can operate on the same basis and determine for itself whether or not a normally omitted element is transmitted or not.

Figure 4:
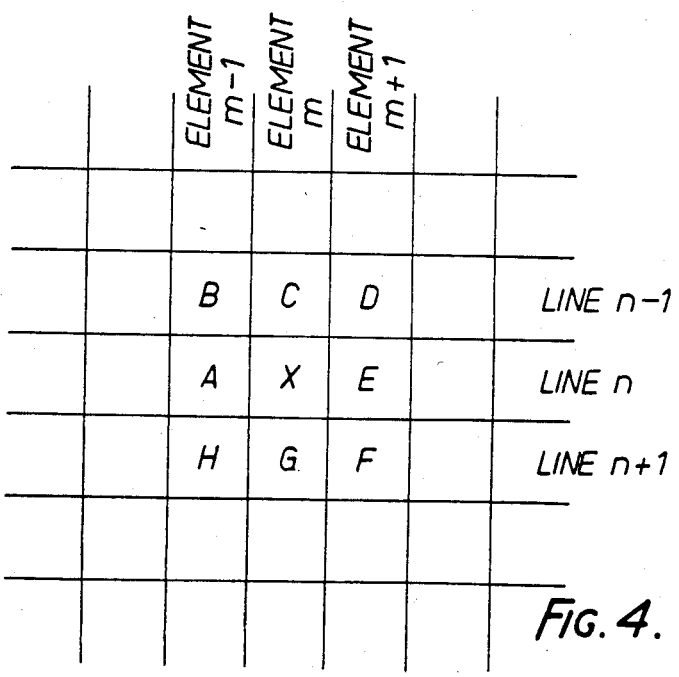
FIG. 4 is a diagram to be used in explaining the criterion for determining whether or not the information relating to the change of particular picture element is to be transmitted or not.

Referring now to FIG. 4 which shows nine elements in three consecutive lines of a picture, the element X in the centre is the one under consideration as to whether or not it should be transmitted. It is assumed that in the ordinary way in the element sub-sampling mode the elements A and E would be transmitted and the element X omitted. A test proposed for determining whether or not the element X should be transmitted is to ascertain the magnitude of the difference between the brightness of, for example, the elements B and D, these being in the line n−1, preceding line n in which the element X lies. If this difference exceeds some threshold value found by experiment to give good results, then the element X is transmitted because there is a probability of a significant vertical edge passing through the array of nine elements. On the other hand, if the difference is less than the threshold value, then the element X is omitted and the value of its brightness difference is ascertained by interpolation at the receiver.

It will be appreciated that the elements B and D may not be transmitted, in which case the values obtained by interpolation between the values that are transmitted could be used or the elements outside B and D used instead.

Unfortunately, using this process exactly as described above, it is prone to breakdown if one or more brightness differences is corrupted by an error in transmission or noise. For example, if at the encoder the brightness changes at elements B and D differ by an amount exceeding the threshold value but the values of the changes received by the receiver do not, then the encoder will correctly transmit the change at the element X but the receiver will interpret this change as belonging to the element E because the criterion for the transmission of the change at the element X was not met at the receiver. This mistake will cause noticeable corruption of the picture which could persist until the end of the particular field.

In order to overcome this difficulty when the brightness change of an element which would normally be omitted is transmitted, the coding of the brightness changes of all the elements affected and also of those elements in the same lines and adjacent to the affected elements are subjected to 8-level quantisation instead of 16-level quantisation, and in addition the elements which would normally be omitted are transmitted using codes which are different from those used by the normally transmitted elements. The 16-level quantisation requires sixteen different codes which may be numbered 1 to 16. When normally omitted elements are transmitted, the codes 1 to 8 are used for normally transmitted elements, and codes 9 to 16 are used for normally omitted elements, for example.

Preferably, the coding chosen for the 8-level quantisation levels for the normally transmitted elements and for the normally omitted elements is such that the change of number of quantisation levels from 16 to 8 would be apparent to the decoder, for example by the use of Huffman codes, and in addition the chance of a code for an element of one type being transformed by noise into the code for the element of the other type is kept to a minimum.

Figure 5:
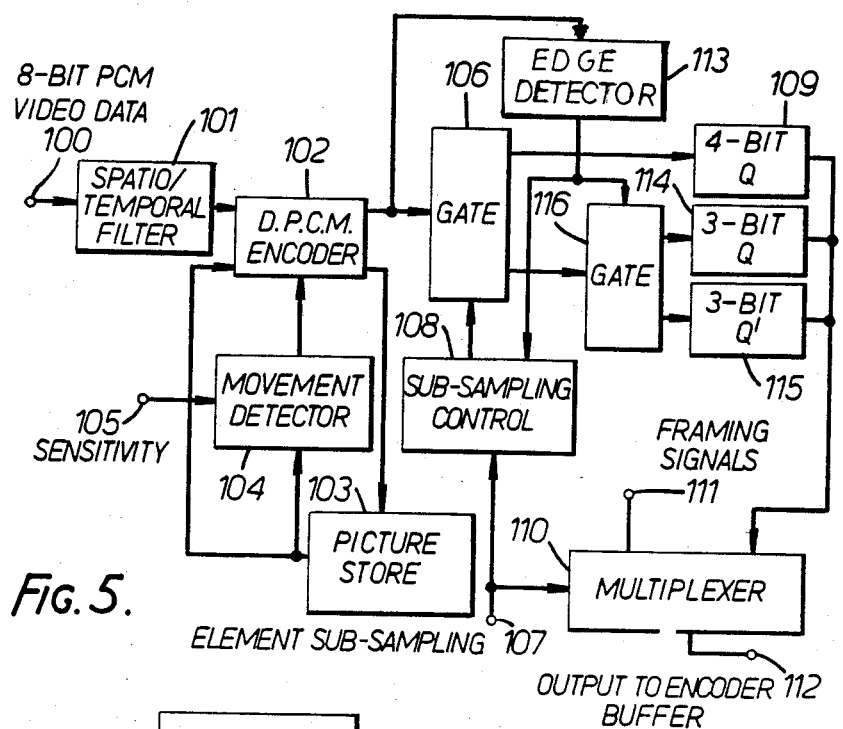
FIG. 5 is a block diagram of a video data encoder.

FIG. 5 shows the block diagram of one example of an encoder for use in the present invention. 8-bit PCM video data is applied to the encoder via a terminal 100 which is connected through a spatio-temporal filter 101 to the input of a DPCM encoder 102. The filter 101 processes the image by spatial non-linear filtering and noise reduction to improve the performance of the subsequent movement detector. The encoder 102 receives as a second input video data representing the preceding frame of the picture from a picture store 103 and a movement detector 104 applies to the encoder 102 data enabling the encoder 102 to detect those elements of the incoming video data which have undergone a change of brightness greater than a threshold level determined by a sensitivity control signal applied to terminal 105. The output of the encoder 102 is applied to a gate 106 which is controlled by a sub-sampling control circuit 108 responsive to a signal applied to terminal 107 indicating whether or not element sub-sampling is in use. When element sub-sampling is not being used the output of the encoder 102 is applied to a 4-bit quantiser 109 and the codes representing the differnet levels are transmitted to a multiplexer 110 where they are combined with frame signals applied to a terminal 111 and a signal indicating whether or not element sub-sampling has been used to produce a combined output signal at terminal 112 for application to an encoder buffer. When element sub-sampling is in use, alternate codes in the output of the encoder 102 are passed by the gate 106 to the 4-bit quantiser 109 and thence to the terminal 112 as before, the control circuit 108 controlling the gate 106. A detector 113 is connected to respond to the input to the gate 106 to produce an output when the video data indicates the presence of a moving vertical edge. The output of the detector 113 is applied to the control circuit 108 and to a gate 116. As long as no such edges are detected, the sub-sampled signals are applied to the 4-bit quantiser 109 as described above. When a moving vertical edge is detected, the output of the gate 106 is switched to the input of a gate 116 controlled by the output of the detector 113 so that normally transmitted elements are applied to a 3-bit quantiser 114 and normally omitted elements are applied to a 3-bit quantiser 115. The outputs of quantisers 114 and 115 are also connected to the multiplexer 110.

From a consideration of FIG. 5, it will be apparent how sub-sampled signals as described above are produced.

Figure 6:
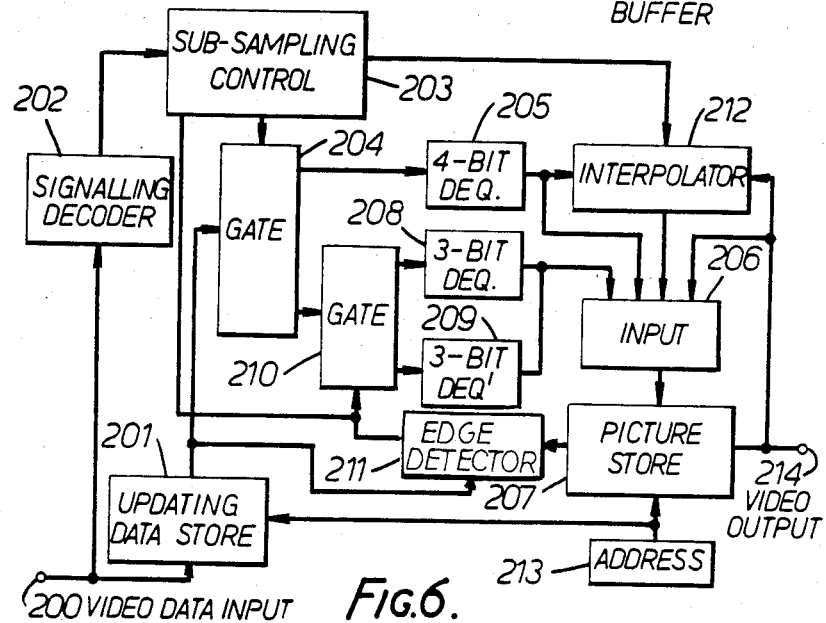
FIG. 6 is a block diagram of a video data decoder.

FIG. 6 shows a block diagram of one example of a decoder or signals such as might be produced by the encoder of FIG. 5. The received signals enter via a terminal 200 and are stored into an updating data store 201 and are also applied to a signalling decoder 202 which detects the presence of an indication of sub-sampling. If sub-sampling is present, an indication is sent to a subsampling control circuit 203 and this controls a gate 204 to direct the data from the store 201 either via a 4-bit de-quantiser 205 to input circuits 206 of a picture store 207 or via one or other of two 3-bit quantisers 208 and 209, depending on the control of a gate 210 to which the output of the gate 204 is connected. A detector circuit 211 connected to the outputs of the updating data store 201 and the picture store 207 looks for signals indicating the presence of a moving vertical edge as mentioned above and if such an edge is detected, produces signals to control the gate 210 and also applies a signal to the sub-sampling control circuit 203. An interpolator 212 is provided for interpolating between the output of the de-quantiser 205 and an output signal from the picture store 207 to generate the brightness change signal for a normally omitted element. Address circuits 213 perform the scanning of the picture store 207 to produce the video output on terminal 214 and also address the updating data store 201 so that any updating data for the element currently being scanned in the picture store 207 is read out for updating the picture store 207.

In the operation of FIG. 6, if element sub-sampling is not in use the output of the data store 201 is applied via the 4-bit de-quantiser 205 to update the data in the picture store 207. When element sub-sampling is used an output from the control circuits 203 activates the interpolator 212 so that updating data for the omitted elements is produced from that for the transmitted elements. If the detector 211 detects a moving vertical edge using the criterion described above it applies signals to the sub-sampling control circuits 203 and to the gate 210 so that the updating data are applied alternately via quantisers 208 and 209 to the input 206 of the picture store 207.

What I claim is:

1. A digital video data processing apparatus of the type which generates digital image data representing a predetermined array of picture elements raster scanned in a pre-determined order based on input conditional replenishment digital video data representing updates for changing picture element portions of the image, said apparatus comprising:

control means for detecting the presence of sub-sampled rate data wherein replenishment data for a predetermined sub-set of picture elements is missing;

first means connected to receive and decode full rate replenishment data unless sub-sampled rate data is present;

second means connected to receive and decode sub-sampled rate data if present;

interpolation means connected to receive decoded sub-sampled rate data and to supply interpolated values for missing picture elements; and image storage means connected to receive the interpolated values and the decoded outputs from the first and second means to derive picture element values for an entire received video image.

2. A digital video data processing method of the type which generates digital image data representing a predetermined array of picture elements raster scanned in a pre-determined order based on input conditional replenishment digital video data representing updates for changing picture element portions of the image, said method comprising:

detecting the presence of sub-sampled rate data wherein replenishment data for a predetermined sub-set of picture elements is missing;

receiving and decoding full rate replenishmnent data in a first dequantizer unless sub-sampled rate data is present;

receiving and decoding sub-sampled rate data in a second dequantizer if sub-sampled rate data is present;

supplying interpolated values for the missing picture elements if sub-sampled rate data is present; and storing the interpolated values and the decoded outputs from the first and second dequantizers to derive picture element values for an entire received video image.

3. A video data transmission apparatus of the type which generates conditional replenishment digital video data to update the changing picture element portions of a video image having a predetermined array of picture elements raster scanned in a predetermined order for data generation and transmission, said apparatus comprising:
   transmitting means for transmitting said data over a transmission channel having a predetermined data rate capacity;
   picture element sub-sampling means for selectively suppressing the transmission of replenishment data for a predetermined sub-set of picture elements when necessary to control the transmitted data rate within said predetermined data rate capacity; and
   means for detecting the presence of a vertical moving edge in said image and for inhibiting said sub-sampling means for picture elements located in the immediate vicinity of such a moving edge thereby insuring full rate sampling and transmission of replenishment data in such locations.

4. A video data transmission apparatus as in claim 3 wherein said sub-sampling means includes means for digitally quantizing and encoding the data to be transmitted in a distinctive recognizable manner when it is operative so as to automatically distinguish sub-sampled replenishment data from fully sampled data.

5. A video date transmission method of the type which generates conditional replenishment digital video data to update the changing picture element portions of a video image having a predetermined array of picture elements raster scanned in a predetermined order for data generation and transmission, said method comprising:
   transmitting said data over a transmission channel having a predetermined data rate capacity;
   selectively suppressing the transmission of replenishment data for a predetermined sub-set of picture elements when necessary to control the transmitted data rate within said predetermined data rate capacity; and
   detecting the presence of a vertical moving edge in said image and inhibiting said suppressing step for picture elements located in the immediate vicinity of such a moving edge thereby insuring full rate sampling and transmission of replenishment data in such locations.

6. A video data transmission method as in claim 5 further comprising the step of digitally quantizing and encoding the sub-sampled data to be transmitted in a distinctive recognizable manner so as to automatically distinguish transmitted sub-sampled replenishment data from fully sampled data.

7. A video transmission system for transmitting a picture which changes with time and which is represented as it changes by a succession of frames, each frame comprising digital signal values corresponding to the brightness at picture elements along parallel lines across the picture, said system including:
   means for comparing the brightness values between corresponding picture elements in a previous and a present frame,
   means responsive to the number of picture elements in the present frame which have undergone changes in brightness since the previous frame to select certain isolated picture elements,
   means for transmitting representations of the changes in brightness of some picture elements from frame-to-frame while omitting transmission of such representations for said selected certain isolated picture elements, and
   a receiver for receiving the transmitted information including a frame means for recording the brightness values of the elements of the picture, means for calculating from the transmitted represenations the changes in brightness value of the said omitted certain isolated elements, and means for updating the recorded brightness values with the transmitted and calculated information,
   wherein said means selecting certain isolated elements includes means for detecting differences in brightness above a predetermined threshold value between adjacent or near adjacent elements in a line of the present frame and for excluding from the said selected certain isolated elements any element in the next line of the present frame which is in the neighborhood of elements displaying such large differences in brightness.

8. A system according to claim 7 wherein the certain isolated elements are alternate elements in a group of consecutive elements in a line which are undergoing changes in brightness.

9. A system according to claim 8 wherein the certain isolated elements lie in diagonal rows in an area of contiguous elements undergoing brightness changes.

10. A system according to claim 7 wherein the transmitter includes means for detecting the presence of a vertically extending moving edge in the picture and for arranging that brightness change data are transmitted for all elements adjacent that edge even when brightness change data for the certain isolated elements are not transmitted.

11. A system according to claim 10 wherein the receiver includes means for detecting the presence of a vertically extending moving edge in the picture data received and for treating received data relating to picture elements adjacent any such edge as relating to all such adjacent elements although brightness change data for certain isolated elements may not be received.

12. A sytem according to claim 7 further including:
   quantizing means for quantizing a brightness value such that, (a) when no said certain isolated elements are selected, brightness values are encoded using a first number of quantizing levels, and (b) when said certain isolated elements are selected, brightness values are encoded using a second number of quantizing levels smaller than the first number, and
   encoding means for the quantized brightness values which employs a first set of digital codes for the values which are normally transmitted and a second set of digital codes for the values of elements excluded from the selected said certain isolated elements.

13. A system according to claim 12 wherein the codes of the first set and the codes of the second set are chosen so that a transmission error would not corrupt a code of one set into a code of the other set.

14. A system according to claim 12 wherein the second number of quantizing levels is half the first number of quantizing levels, and the first and second sets of codes, alternatively used for encoding the second number of quantizing levels, together constitute the codes used for encoding the first number of quantizing levels.

15. A system according to claim 14 wherein the first number of quantizing levels is 8 and the second number of quantizing levels is 4.

* * * * *